United States Patent [19]
Forward

[11] Patent Number: 5,746,923
[45] Date of Patent: May 5, 1998

[54] CONTROL OF IRON DEPOSITION IN BOREHOLE PUMPS

[75] Inventor: Peter Forward, Berri, Australia

[73] Assignee: Minister For Infrastructure, South Australia, Australia

[21] Appl. No.: 619,562

[22] PCT Filed: Sep. 28, 1994

[86] PCT No.: PCT/AU94/00580

§ 371 Date: Mar. 27, 1996

§ 102(e) Date: Mar. 27, 1996

[87] PCT Pub. No.: WO95/09283

PCT Pub. Date: Apr. 6, 1995

[30] Foreign Application Priority Data

Sep. 28, 1993 [AU] Australia ............... PM1473

[51] Int. Cl.$^6$ .................................................. C02F 5/08
[52] U.S. Cl. .......... 210/696; 134/22.11; 134/22.14; 166/90.1; 205/701; 205/740; 210/101; 210/170; 210/192; 210/198.1; 210/698; 210/747; 210/748; 210/754; 210/764
[58] Field of Search ............... 210/754, 764, 210/198.1, 696, 794, 748, 759, 101, 108, 192, 747, 170, 698; 134/22.11, 22.14; 166/90.1; 205/701, 740

[56] References Cited

U.S. PATENT DOCUMENTS

| | | |
|---|---|---|
| 3,335,791 | 8/1967 | Patton . |
| 4,088,575 | 5/1978 | Hilty ............... 210/764 |
| 4,256,552 | 3/1981 | Sweeney ............... 210/754 |
| 4,297,224 | 10/1981 | Macchiarolo et al. . |
| 5,025,822 | 6/1991 | Guggisberg ............... 210/198.1 |
| 5,035,796 | 7/1991 | Saylor et al. ............... 210/198.1 |
| 5,103,914 | 4/1992 | LaHaye ............... 210/198.1 |
| 5,360,488 | 11/1994 | Heiatt et al. ............... 134/22.11 |
| 5,393,433 | 2/1995 | Espana et al. ............... 210/754 |

FOREIGN PATENT DOCUMENTS

| | | |
|---|---|---|
| 0 224 346 | 6/1987 | European Pat. Off. . |
| 1279546 | 11/1961 | France . |

Primary Examiner—Peter A. Hruskoci
Assistant Examiner—Betsey J. Morrison
Attorney, Agent, or Firm—Finnegan, Henderson, Farabow, Garrett & Dunner, L.L.P.

[57] ABSTRACT

Method and apparatus for the control of deposition of contaminants in pumping systems. The method includes the steps of periodically stopping the pump and back feeding chlorinated water and/or surfactants and other organic or inorganic acids at a reduced flow rate through the outlet pipe of the pump and through the pump itself to control the deposition of materials by bacterial action and/or to control biofouling and/or abiotic encrustation. The apparatus includes a bypass and valving to provide a back flow of the chlorinated water and/or surfactants and other organic or inorganic acids through the pumping installation at a relatively slow flow rate and equipment for the feeding desired decontaminants into the back flow.

10 Claims, 3 Drawing Sheets

→ : Water flow while pumping
--- : Water flow while chlorinating

CONTROL OF IRON DEPOSITION IN BOREHOLE PUMPS

This invention relates to methods and apparatus for the control of microbial encrustation (biofouling) and microbial corrosion in ground water pumping systems.

BACKGROUND OF THE INVENTION

The major processes that cause deterioration of ground water bores (wells) are physical, chemical, and microbial. The resultant problems affect parts of the pumping system; bore, aquifer, pump, discharge and distribution components. In some cases some of the processes can simultaneously affect parts of the system to differing degrees.

Ground water typically contains a wide range of dissolved chemicals but in the absence of external contamination, aquifers were once assumed to be microbiologically clean. However, it is now recognised that bacteria are endemic in aquifers throughout the world and that aquifers can allow the free transmission of bacteria under suitable conditions. Given a suitable physical and chemical environment, bacteria can thrive and give rise to a multitude of problems.

The phenomenon of microbiological encrustation (biofouling) is now well recognised world wide. It is caused by the accumulation of microbes (bacteria, often called "iron related bacteria"), extracellular polymeric substances and inorganic precipitates, typically iron, manganese, aluminium or other oxides. In the case of iron, the bacteria derive energy during their metabolism through oxidising soluble ferrous iron to insoluble ferric iron. The resultant biofilm is commonly found as a slimy or gelatinous deposit in bore screens, pump inlets, internal waterways and discharge components, sometimes extending well into the distribution pipe system.

Depending on the severity of the biofouling, various detrimental effects may occur including:

Degraded water quality (colour, taste, odour)

Reduced hydraulic efficiency due to clogging of the gravel-pack screen slots, pump and pipework Corrosion of materials due to the creation of adverse electrochemical conditions Other types of bacteria cause corrosion problems such as:

Sulphate oxidising bacteria produce sulphuric acid

Sulphate reducing bacteria produce a variety of substances including hydrogen sulphide Fermentation process produce organic acids Many techniques have been used to rehabilitate bores:

Physical methods include high pressure water jetting, compressed air surging and brushing or swabbing.

Chemical methods, often used in conjunction with physical agitation include the use of organic or inorganic acids in conjunction with surfactants and biocides such as chlorine, hydrogen peroxide and quaternary ammonium compounds. Many proprietary bore cleaning products are available using various combinations of these chemicals.

Such treatments often have to be repeated regularly and can be time consuming to carry out, result in significant loss of pumping time, can be very expensive if large quantities of chemical are required and sometimes require considerable ancillary mechanical equipment such as pumps, compressors, and cranes etc.

It would be preferable to implement a system to prevent or control the build up of bacteria in a ground water pumping system by regular disinfection rather than undertaking remedial treatment once the problem has become intolerable.

The problem of dissolved iron in ground water has attempted to be overcome by Patent No SU 1504226 which involves a vacuum section to remove gasses in the water followed by an aeration section with a filter to remove trivalent iron. Also Patent No CN 87106661 uses oxygen aeration to remove iron and manganese from ground water. SU 1161480 describes the use of atmospheric air to remove dissolved iron, while DE 3333842 describes removing iron and manganese from water wells by admitting compressed air to one or two wells in turn. AU8429683 describes a method where oxygen containing water is injected into the ground water and removing cleansed water from the ground water around or adjacent the point of injection. SU 859322 describes passing the water through a filter or bed which is provided with a negative potential to remove the iron.

It is an object of this invention to provide a solution to the above problems and to provide control measures which should minimise the foregoing factors.

While chlorine is known to be effective in controlling bacteria the invention has an object to provide a simple and economical process for the in situ electric generation of chlorine from the ground water being pumped if it has a high enough chlorine content.

The principle of electrolytic generation of chlorine from salt water or concentrated brine (sodium chloride) solutions is widely used in industry and in domestic salt water swimming pools. However if electrolytic generation is used to generate a sufficiently high concentration of chlorine to be effective in the high flow rates often required for pumping ground water, the costs could be excessive. Thus if a pump flow of 4.0L/s is required, an appropriate size electrode assembly running at greater than 50 Amps may be necessary to maintain a chlorine residual of 1.0ppm depending on the chemical composition of the water being pumped.

In many situations it may not be physically or economically feasible to install an electrode assembly of sufficient chlorine production capacity down a bore at the inlet to the pump.

It has been found that with the installation of a surface mounted chlorinator which has many advantages over a down the hole installation and periodically back flushing the pump and lines with chlorinated water that effective control of biofouling or abiotic encrustation (non-bacterial accumulation of material) can be achieved.

In situations where the groundwater does not have a high enough chloride content to permit the production of electrolytically generated chlorine, the back flushing of the pump and lines with a disinfectant or biocide has been found to be equally effective.

BRIEF STATEMENT OF THE INVENTION

Thus there is provided according to the invention a method of controlling deposition of biofouling or abiotic encrustation in groundwater pumping installations, the method including the steps of periodically stopping the pump and backfeeding chlorinated water and/or surfactants and other organic or inorganic acids at a reduced flow rate through the outlet pipe and thus through the pump itself to control the deposition of materials by bacterial action and to control biofouling and/or abiotic encrustation.

In a further form of the invention the method includes the controlling of the deposition of materials such as iron through bacterial action in said pumping installation by a submersible pump connected by a riser to a reflux valve, by the steps of periodically stopping the pump and backfeeding electrolytically generated chlorinated water at a much reduced flow rate via bypass passage around the reflux valve and down the riser through the pump itself.

Also there is provided according to the invention apparatus to control the deposition of biofouling or abiotic encrustation in a groundwater pumping installation, said apparatus including control means to provide a back flow of water through the pumping installation at a reduced flow rate, and feeding means to feed decontaminants into said back flow, said decontaminants being selected from chlorinated water, disinfectants or biocides such as hydrogen peroxide and quaternary ammonium compounds and organic or inorganic acids.

In a preferred form of the invention there are provided means to by-pass a reflux valve so that water at a reduced rate can be passed down the riser and through the pump itself, the backflow water passing through a chlorinator and bypassing the reflux valve to thus control the bacterial action causing the deposition of iron in the pump and riser.

While the following description is directed primarily to the passage of water through a chlorinator,it is to be realised that the invention is not to be limited thereto but aqueous chlorine or other liquid or gaseous substances can be introduced from a container via a contol valve, venturi injector or metering pump with the overall objective of controlling bacterial build up in the pump or well or inducing chemical precipitation or removing organic or inorganic deposits.

Thus by this method, using a much reduced flow of water, the desired chemical concentration can be achieved and the down time of the pump when the pump is stopped for the reverse flushing of the riser and pump need only be up to an hour a day.

While aqueous chlorine is commonly available, any other form of liquid or gaseous disinfectants or biocides such as hydrogen peroxide and quaternary ammonium compounds can be used with equal effectiveness, if necessary in conjunction with surfactants and other organic or inorganic acids to control biofouling and abiotic encrustation (non-bacterial accumulation of material) within the bores.

BRIEF DESCRIPTION OF THE DRAWINGS

In order to more fully describe the invention reference will now be made to the accompanying drawings in which.

DESCRIPTION OF THE PREFERRED EMBODIMENTS

Figure 1:
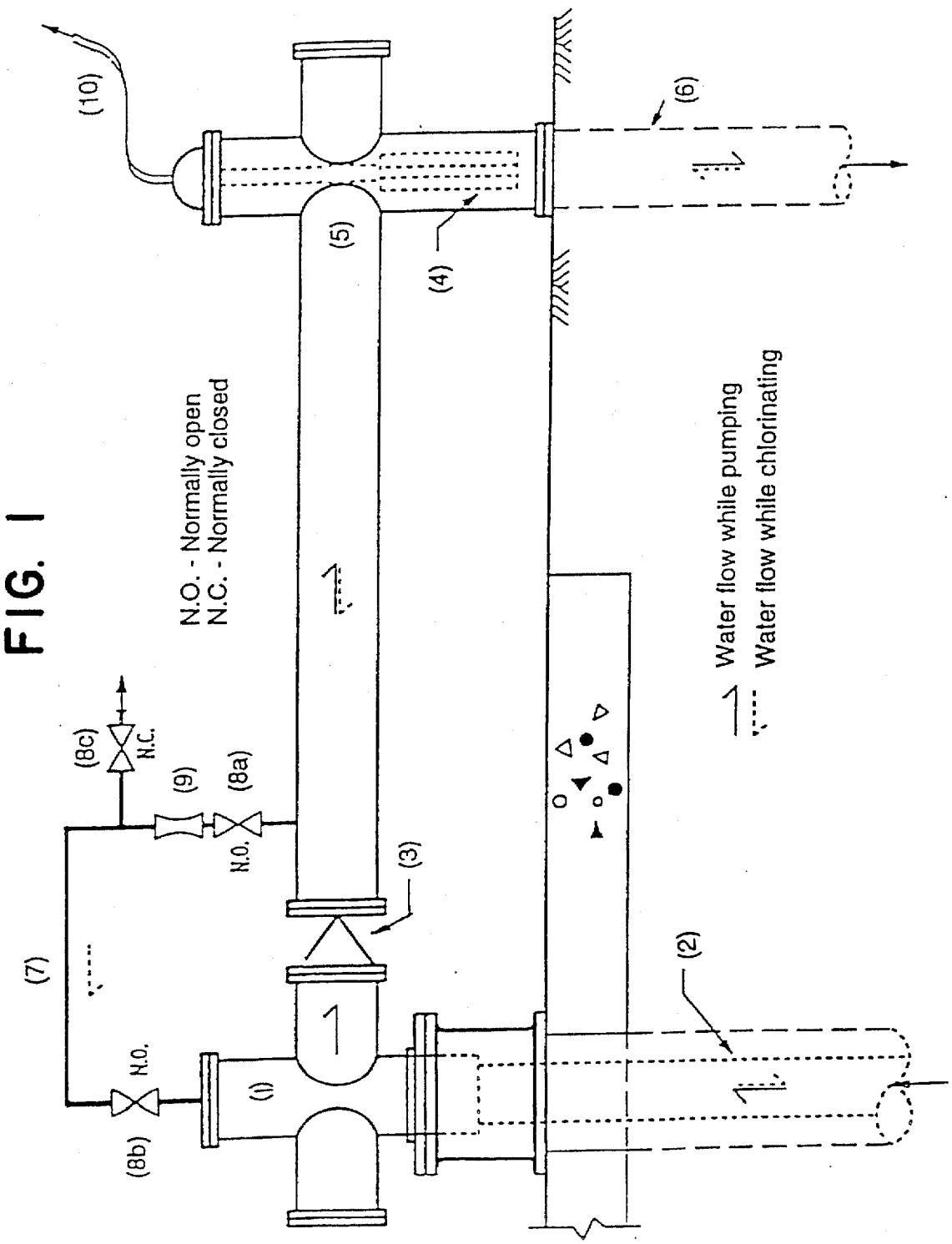
FIG. 1 schematically shows one form of the invention for use with submersible pumps.

Referring firstly to FIG. 1 which shows the invention as applied to submersible pumps which are often commonly employed in pumping ground water, the upper portion of the riser 1 is connected to the riser column 2 which is in turn connected to a pump (not shown) at the bottom of the riser column. The riser 1 is connected to a reflux valve 3 which in turn is connected to the chlorinator assembly 4 positioned in line 5 upstream of the discharge line 6. Between line 5 and the riser 1 there is connected a bypass line 7 with control valves 8 (a), (b) and (c) and control valve 9. The chlorinator is connected via electrical leads 10 to a DC power supply.

Thus when it is desired to periodically reverse flush the pump and riser with chlorinated water, the pump is stopped and the reflux valve closes. Valves 8(a) and 8(b) are normally open and the chlorinator assembly is then energised with electrical power. Water is then caused to flow at a slow rate through the chlorinator assembly where the water is charged with chlorine at the desired high rate, this passing via the bypass line around the reflux valve down the riser and through the submerged pump and into the bore and adjacent aquifer. The water flow during pumping is shown in solid line arrows, while the reverse flow is shown broken line arrows. Valve 9 is the main control valve for the bypass system. Valve 8(c) is normally closed, and is opened when it is desired to test the degree of chlorination of the reverse flow water.

Depending on the pumping installation, as noted above the back flow of water is relatively slow. This is necessary for the chlorinated water to be effective in controlling the bacterial growth, and it has been found that a flow rate of between 2 to 10 liters per minute is quite effective. Also the dosage of chlorine has to be sufficient to be effective and a dosage rate of between 1 to 4 parts per million results in effective reduction in the bacterial growth.

Tests have shown that when the invention was applied to existing pumps which had their flow rates reduced due to an accumulation of iron, the flow rates increased after treatment due to the removal of a proportion of the accumulated iron. When the invention is fitted to new or reconditioned pumps, the flow rates are not reduced. However in instances where the chlorinator was accidentally turned off, the flow rate reduced rapidly due to the accumulation of iron.

While the invention has been particularly directed to the control of bacteria in the underground water deposition of iron, the invention is not to be limited thereto, but is intended to control the deposition of manganese or other cations which may react with chlorine or other introduced chemicals or the growth of bacteria.

Figure 2:
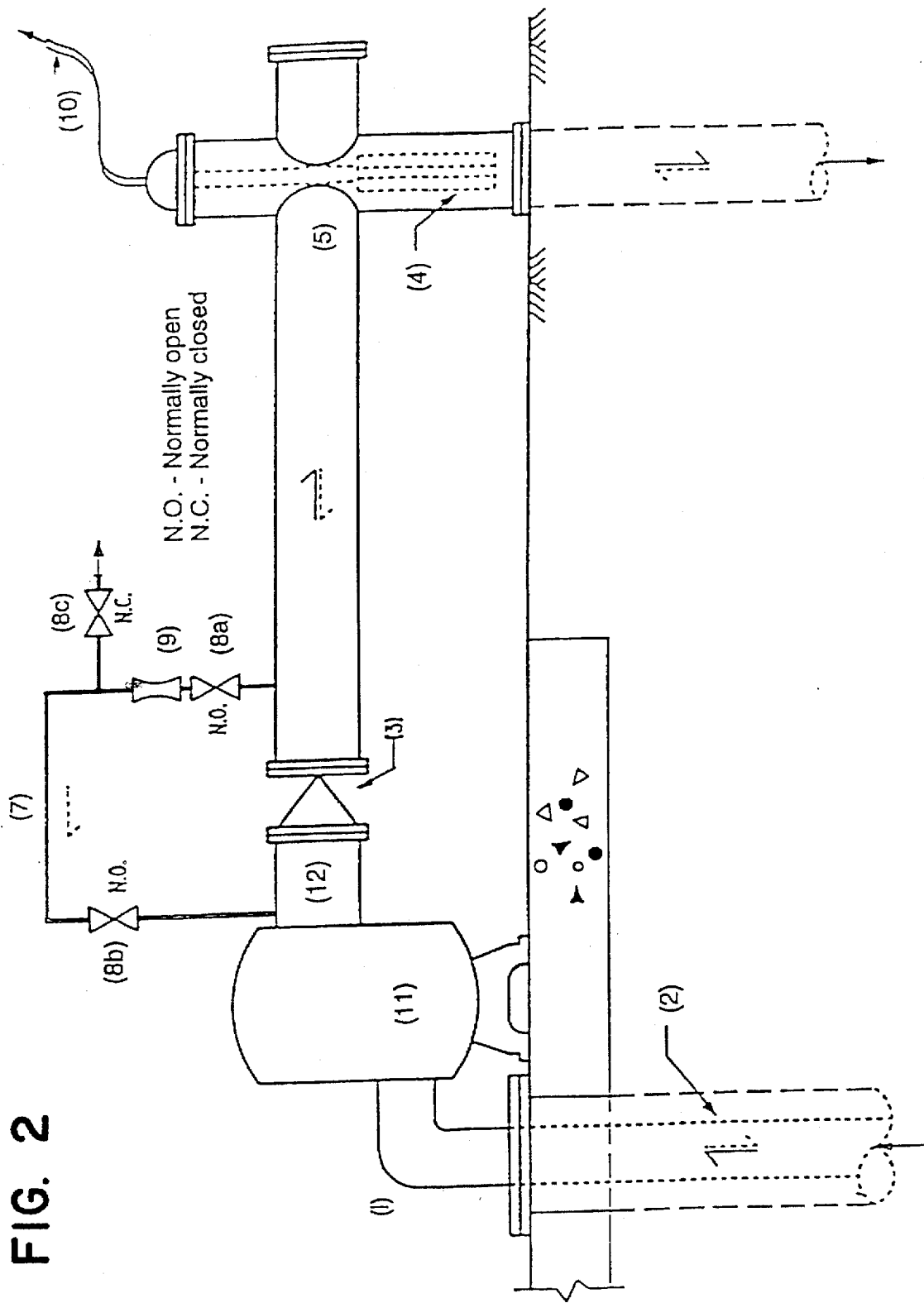
FIG. 2 shows another form of the invention for use with surface mounted pumps.

Turning now to FIG. 2, this shows an installation where the pump 11 is mounted on the surface, the riser 2 being the suction pipe of the pump. The bypass 7 again by passes the reflux valve and is connected to the outlet 12 of the pump 11. The chlorinated reverse flow water thus again passes through the pump and down the riser to the aquifer below.

Figure 3A:
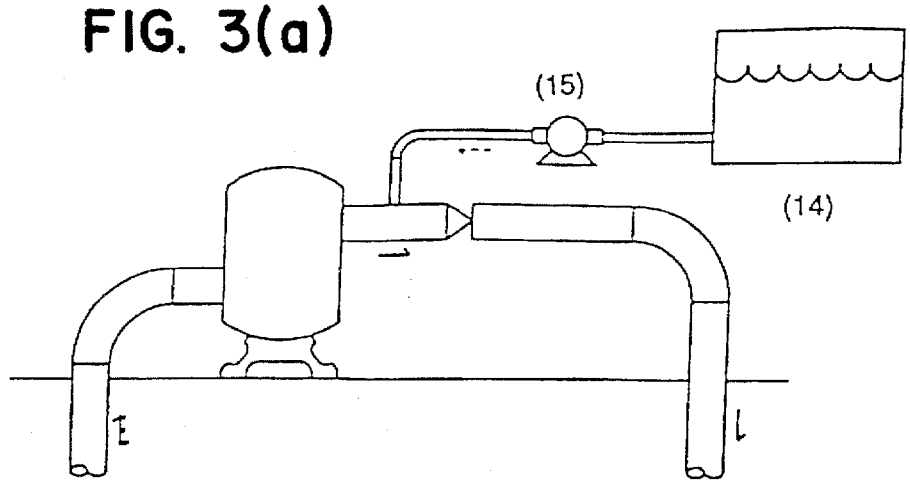
FIG. 3(a) shows a metering pump.

In circumstances where it is not possible to develop chlorine from the water being pumped, chlorine or other substances can be introduced into the pump and bore by various methods. Thus FIG. 3(a) shows a reservoir 14 for the chemical substance to be dosed into the return flow of water. This dosing is controlled by a metering pump 15 which delivers the controlled amount of substance as demanded by the control system. The substance is delivered into the outlet of the pump to thus pass through the pump into the aquifer. In this instance the pumping installation may be such that it is not possible to produce a backflow of water through the pump due to a lack of head of water in the discharge pipe. Thus there is provided the reservoir 14 which is sufficient in capacity to provide the required backflow through the pump. The water in the reservoir may have the desired chemical substance added thereto as desired.

Figure 3B:
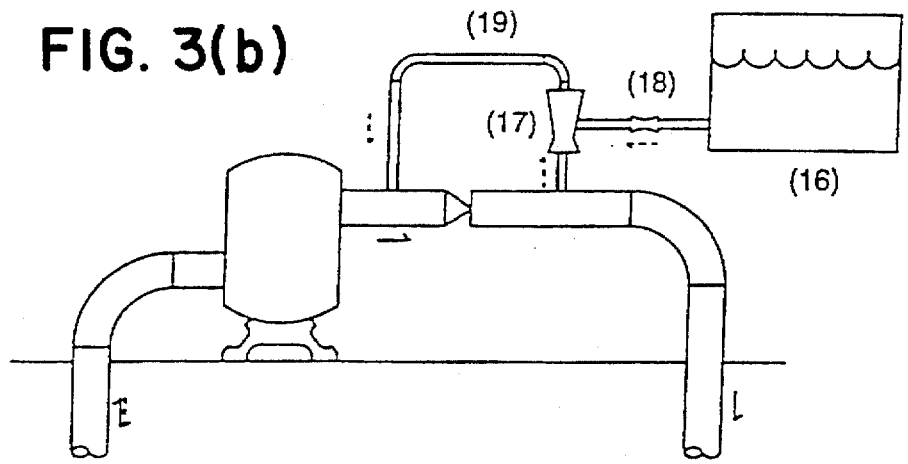
FIG. 3(b) shows a venturi type injector.

FIG. 3(b) shows a further example where the chemical substance in a reservoir or container 16 is passed through a control valve 18 to an injector 17 positioned in the bypass line 19.

A further example is shown in FIG. (3C) where there is provided a reservoir 14 of water and the chemical substance, the water being fed through a control valve 18 and solenoid or hydraulically or pneumatically operated valve 20 into the outlet of the pump. This flow of water and substance is sufficient to create the required back flow through the pump and riser.

Figure 3C:
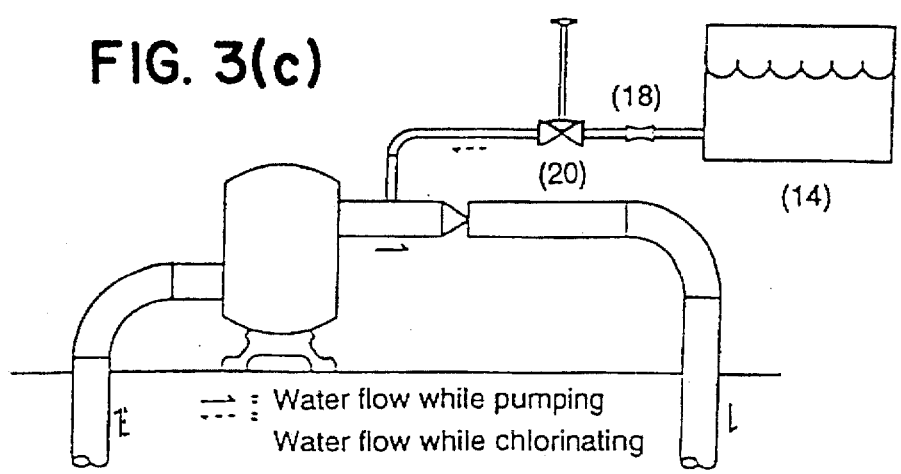
FIG. 3(c) shows hydraulically or pneumatically solenoid operated valves.

While the examples given in FIG. 3 are illustrative of a surface mounted pump, it is to be realised that these chemical dosing arrangements can also be implemented for submersible pumps.

Thus it can be seen that according to the invention there is provided a simple and effective method and apparatus to overcome the objects of the invention. By utilising the back flow principle, say for one hour per day, the build up of contaminants in the pumping system is virtually prevented, and there is a minimum of downtime for the pump.

Although various forms of the invention have been described in some detail, it is to be realised that the invention is not to be limited thereto, but can include variations and modifications falling within the spirit and scope of the invention.

I claim:

1. A method of controlling deposition of biofouling or abiotic encrustation in a groundwater pumping installation having a submersible pump connected by a riser through a reflux valve to an outlet pipe through which ground water is pumped at a first flow rate, which method comprises the steps of periodically stopping the pump and backfeeding chlorinated water or surfactants or other organic or inorganic acids via a by-pass passage around the reflux valve and down the riser and through the pump itself at a second flow rate reduced relative to the first flow rate to control the deposition in the pumping installation of materials by bacterial action, or to control biofouling or abiotic encrustation therein.

2. The method as defined in claim 1, wherein the step of backfeeding comprises backfeeding electrolytically generated chlorinated water through the pumping installation.

3. Apparatus for controlling the deposition of biofouling or abiotic encrustation in a groundwater pumping installation, wherein the pumping installation comprises a submersible pump connected to a riser and an outlet pipe through which groundwater is pumped through the installation at a first flow rate, a reflux valve in the outlet pipe, bypass means in the outlet pipe for bypassing the reflux valve, control means for providing a back flow of water through said bypass means and through said pumping installation at a second flow rate reduced relative to the first flow rate, and feeding means for feeding decontaminants into said back flow, said decontaminants being selected from the group consisting of chlorinated water, disinfectants, and biocides.

4. Apparatus as defined in claim 3, wherein said riser has a bottom portion connected to said pump and an upper portion connected to said outlet pipe, and an electrolytic chlorinator connected to said outlet pipe, so that the backflow of water can bypass the reflux value and pass through the chlorinator to control the deposition of iron in the pump and riser.

5. Apparatus as defined in claim 4 wherein the bypass means is a passage connected to the outlet line downstream of the reflux valve and upstream of the reflux valve, and control valves are positioned in the said passage, and wherein the feeding means comprises a venturi positioned in said passage and connected to a source of decontaminating liquids selected from the group consisting of hydrogen peroxide, quaternary ammonium compounds, and surfactants and acids to control biofouling or abiotic encrustation.

6. Apparatus as defined in claim 3 wherein the pumping installation further comprises a riser having a lower portion connected to said pump, a surface pump connected to an upper portion of the riser, the riser forming the suction line of the surface pump, and by-pass means for passing the backflow water through the surface pump and down the riser.

7. Apparatus as defined in claim 3 wherein the pump is a submersible pump, and the bottom portion of the riser is connected to the outlet of the pump, so that the backflow water passes down the riser and then through the pump.

8. Apparatus as defined in claim 3 wherein the feeding means is a metering pump.

9. Apparatus as defined in claim 3 wherein the feeding means comprises a reservoir of water and decontaminating substances, and valve means to regulate the flow of water into the pumping system sufficient to create the backflow of water.

10. The apparatus defined in claim 3, wherein the biocides are selected from the group consisting of hydrogen peroxide, quartenary ammonium compounds, and organic and acids and inorganic acids.

* * * * *